C. CRETORS.
CORN POPPING APPARATUS.
APPLICATION FILED JAN. 8, 1917.

1,279,663.

Patented Sept. 24, 1918.
7 SHEETS—SHEET 1.

Witness:
John Enders.

Inventor:
Charles Cretors,
by Robert Burns
Atty.

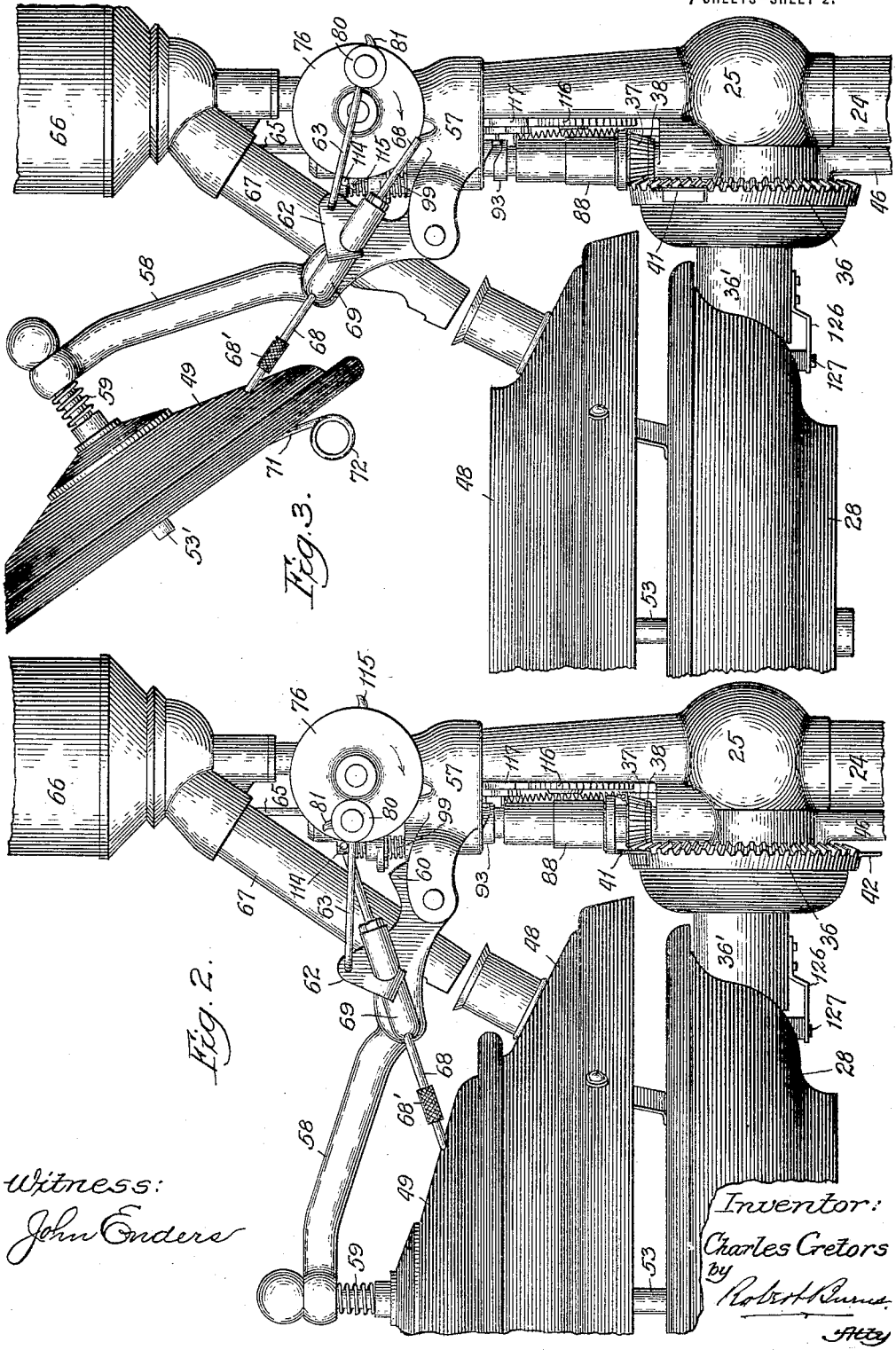

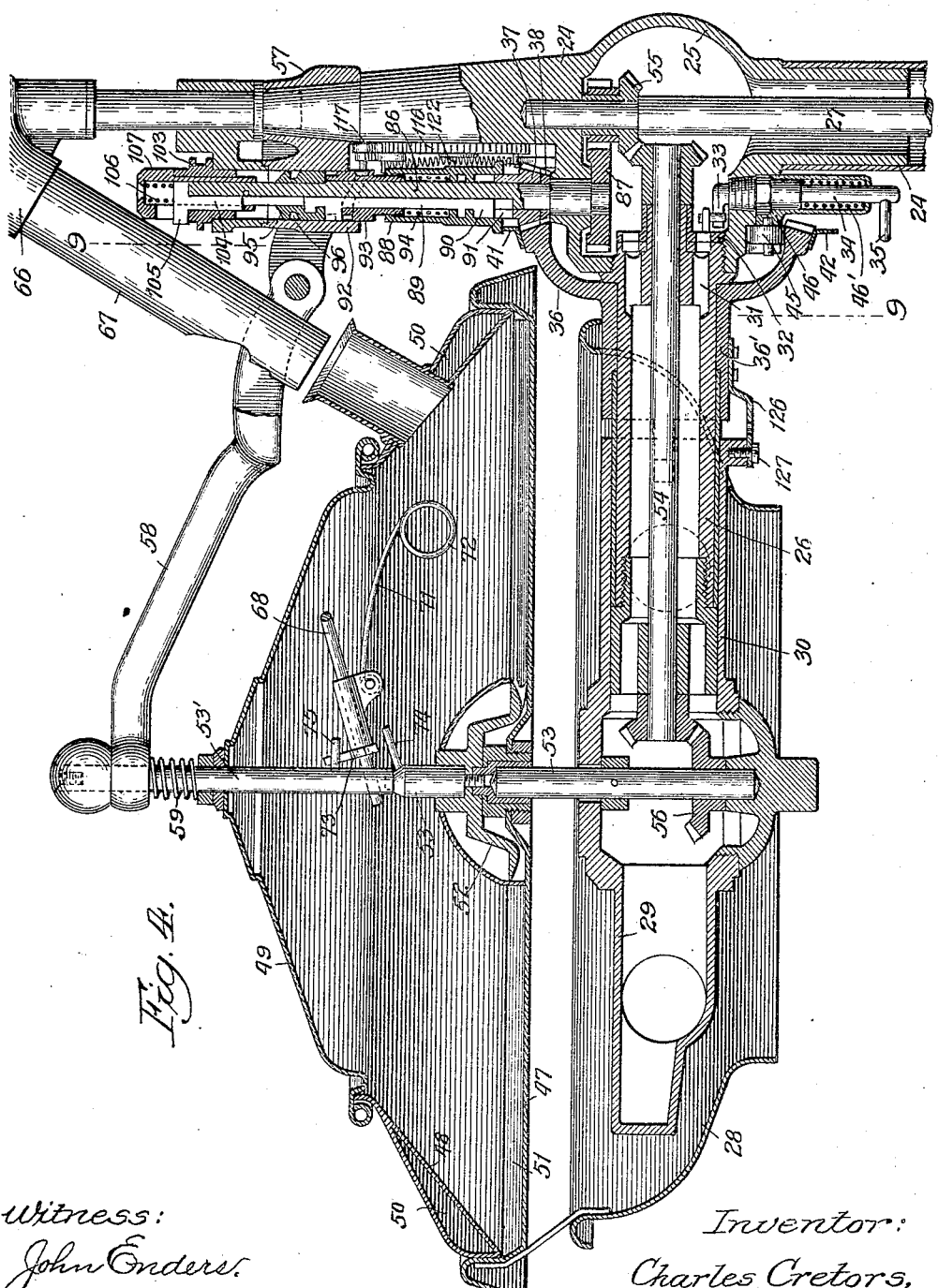

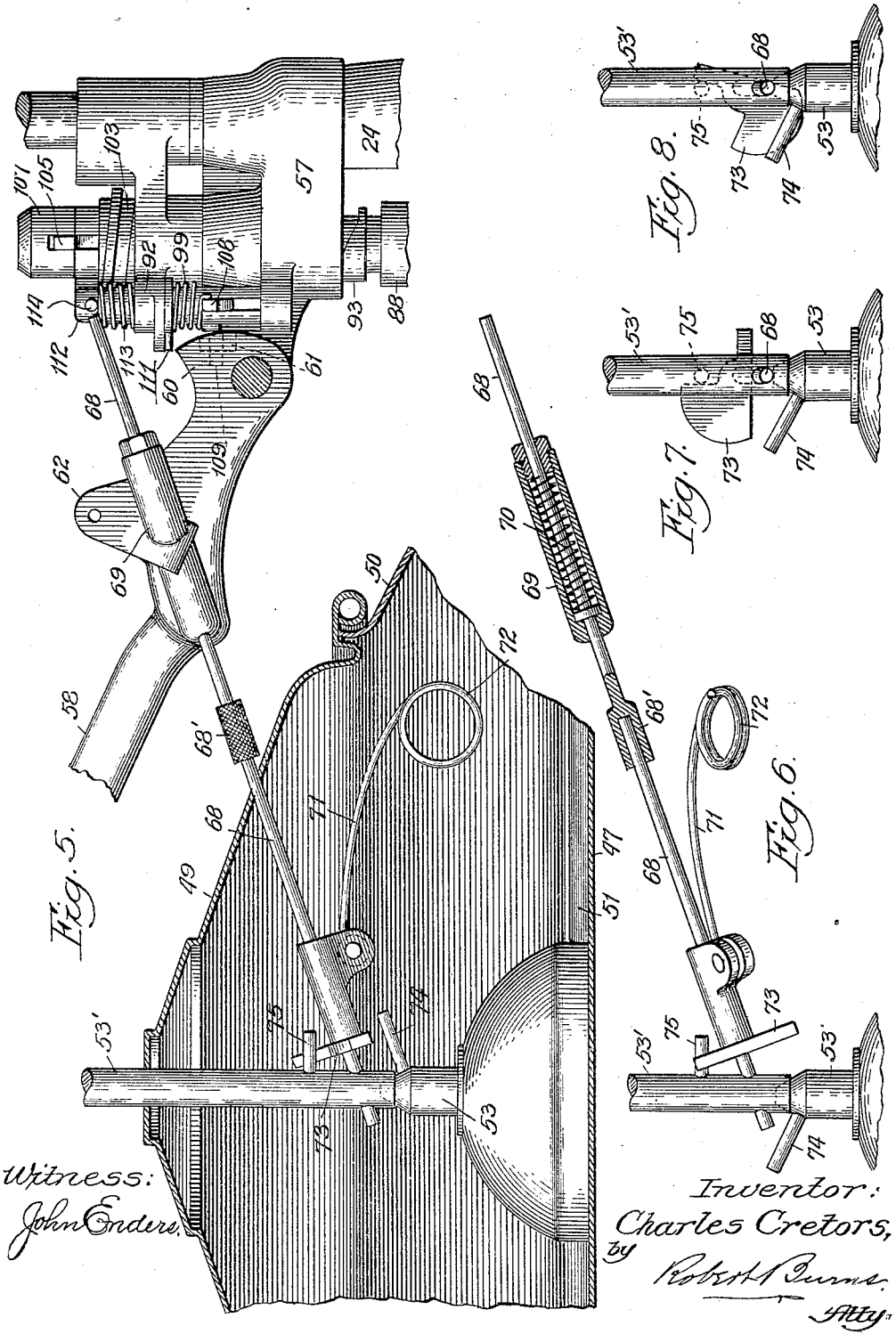

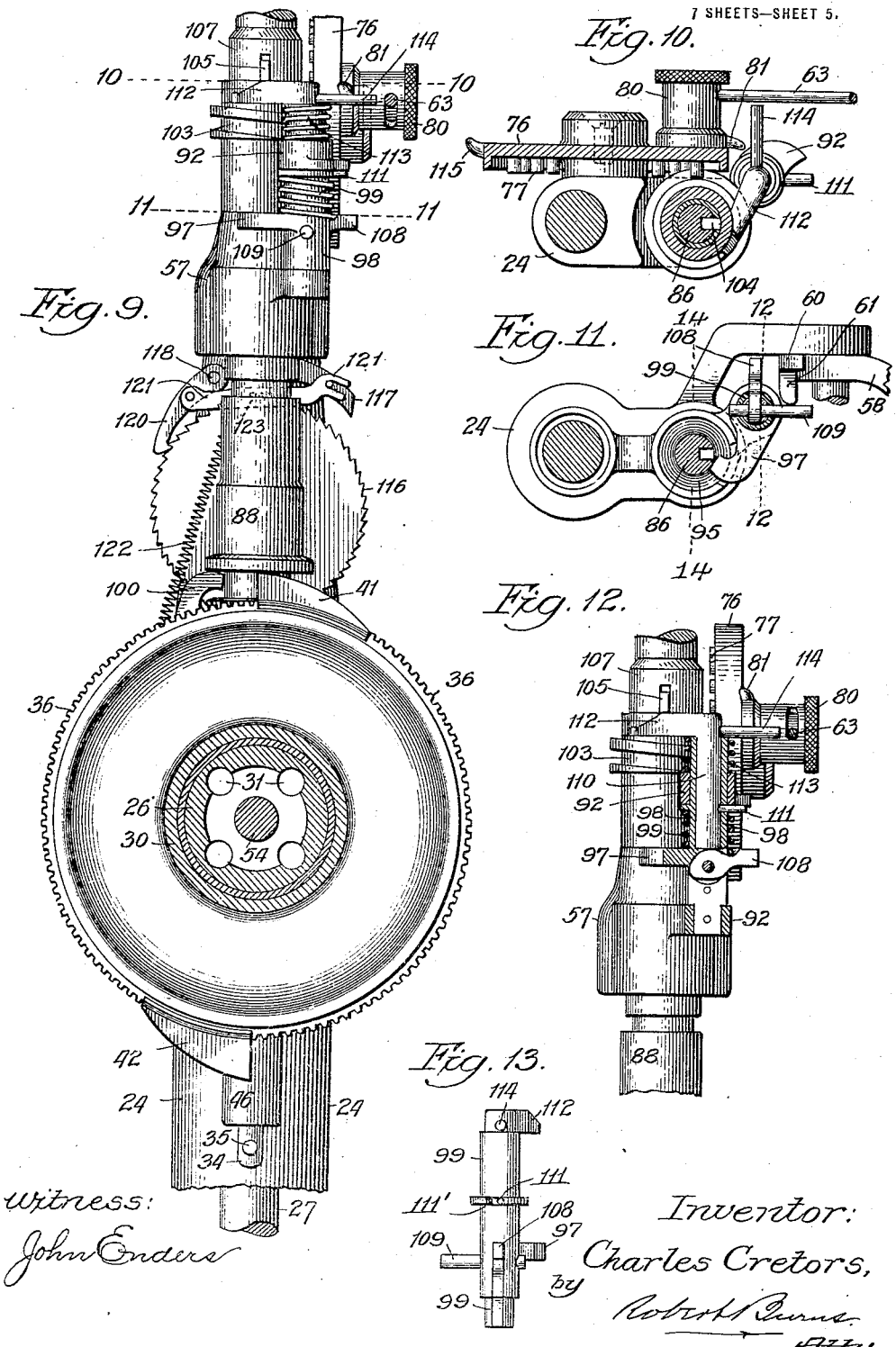

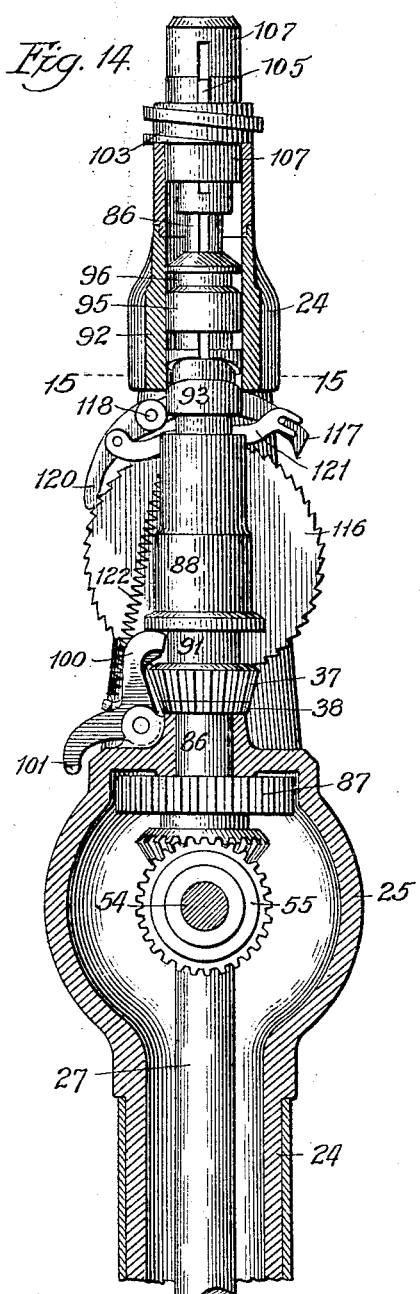
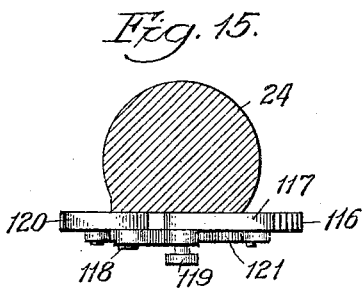
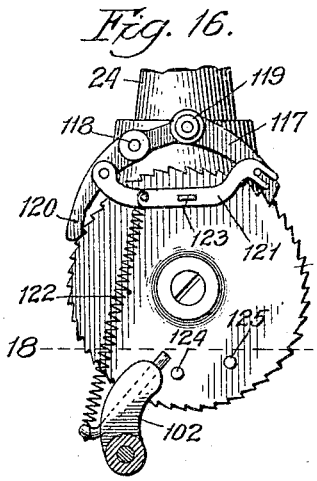
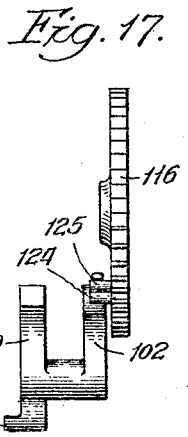
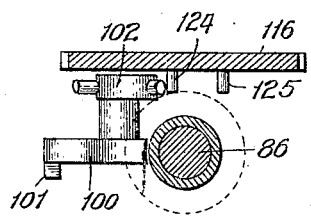

C. CRETORS.
CORN POPPING APPARATUS.
APPLICATION FILED JAN. 8, 1917.
1,279,663.
Patented Sept. 24, 1918.
7 SHEETS—SHEET 7.
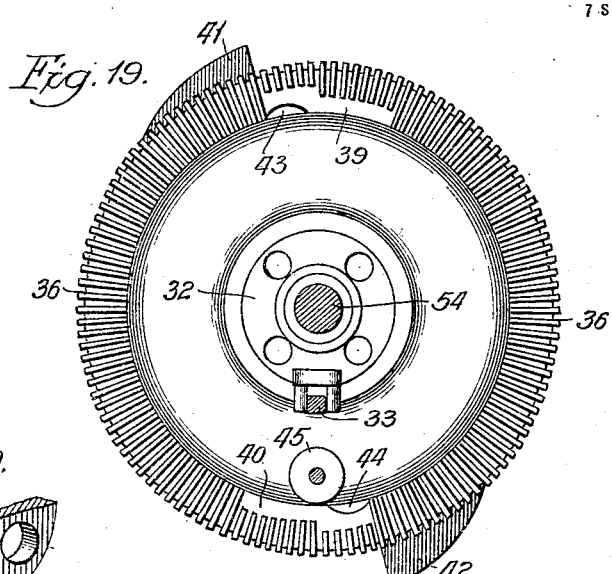
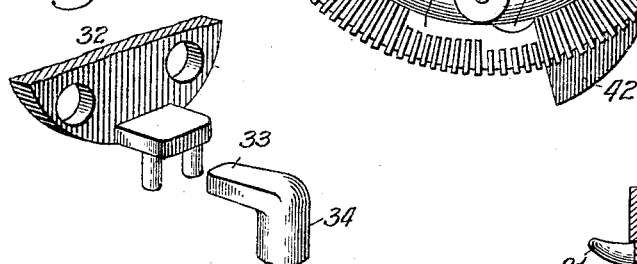
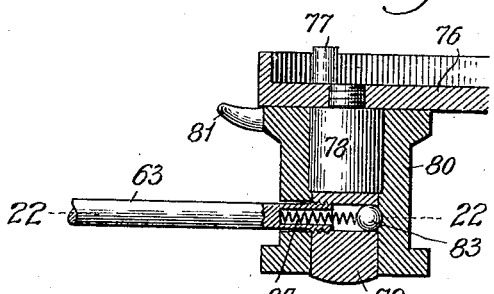
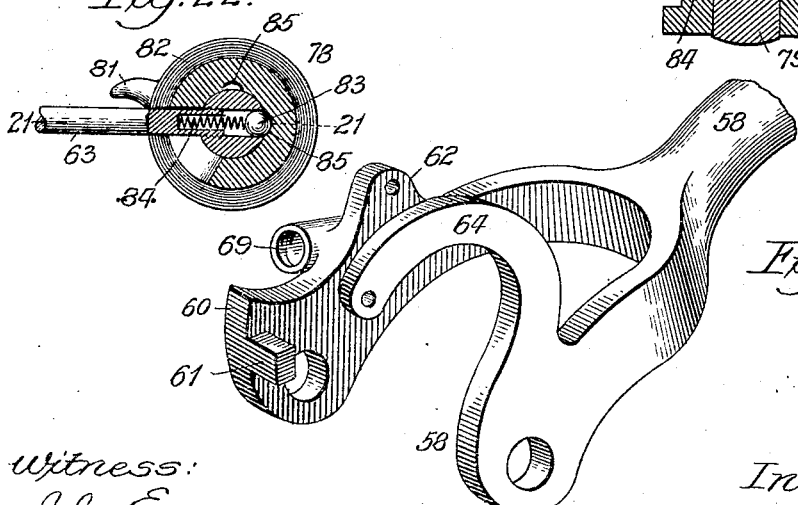
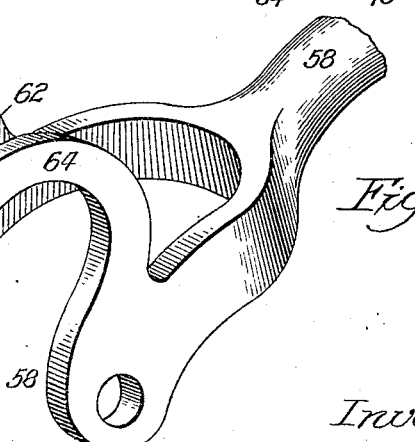
Witness:
John Enders
Inventor.
Charles Cretors,
by
Robert Burns
Atty.

UNITED STATES PATENT OFFICE.

CHARLES CRETORS, OF CHICAGO, ILLINOIS.

CORN-POPPING APPARATUS.

1,279,663.  Specification of Letters Patent.  Patented Sept. 24, 1918.

Application filed January 8, 1917. Serial No. 141,095.

*To all whom it may concern:*

Be it known that I, CHARLES CRETORS, a citizen of the United States of America, and a resident of Chicago, in the county of Cook, State of Illinois, have invented certain new and useful Improvements in Corn-Popping Apparatus, of which the following is a specification.

The invention relates to improvements in the automatic type of corn popping apparatus which constitutes the subject matter of my prior Letters Patent No. 1,201,807, issued October 17, 1916.

And the present improvement has for its various objects:

First: To provide a simple and efficient structural formation and association of mechanisms, whereby the continued operation of the apparatus is rendered automatic and continuous for any required period of time.

Second: To provide a simple and effective means for insuring the proper and exact position of the popping pan, with the completion of semi-revolution of the same in a continued operation of the apparatus.

Third: To provide a simple and efficient formation of the annular hood of the popping pan, whereby the dissipation and loss of heat through the same is prevented and the heat utilized in the final popping of the corn.

Fourth: To provide means for automatically operating a corn measuring mechanism to discharge a supply of unpopped corn into the popping pan, as the same has made a semi-revolution from a discharging position to a righted position ready for a succeeding popping operation.

Fifth: To provide structural formation and combinations of parts in the detail mechanism of the apparatus, whereby the automatic operation of the various mechanisms is serially effected and controlled, as hereinafter more fully described and particularly indicated in the claims.

In the accompanying drawings:—

Fig. 2 is a fragmentary side elevation of the side of the apparatus opposite to that shown in Fig. 1.

Figure 1:
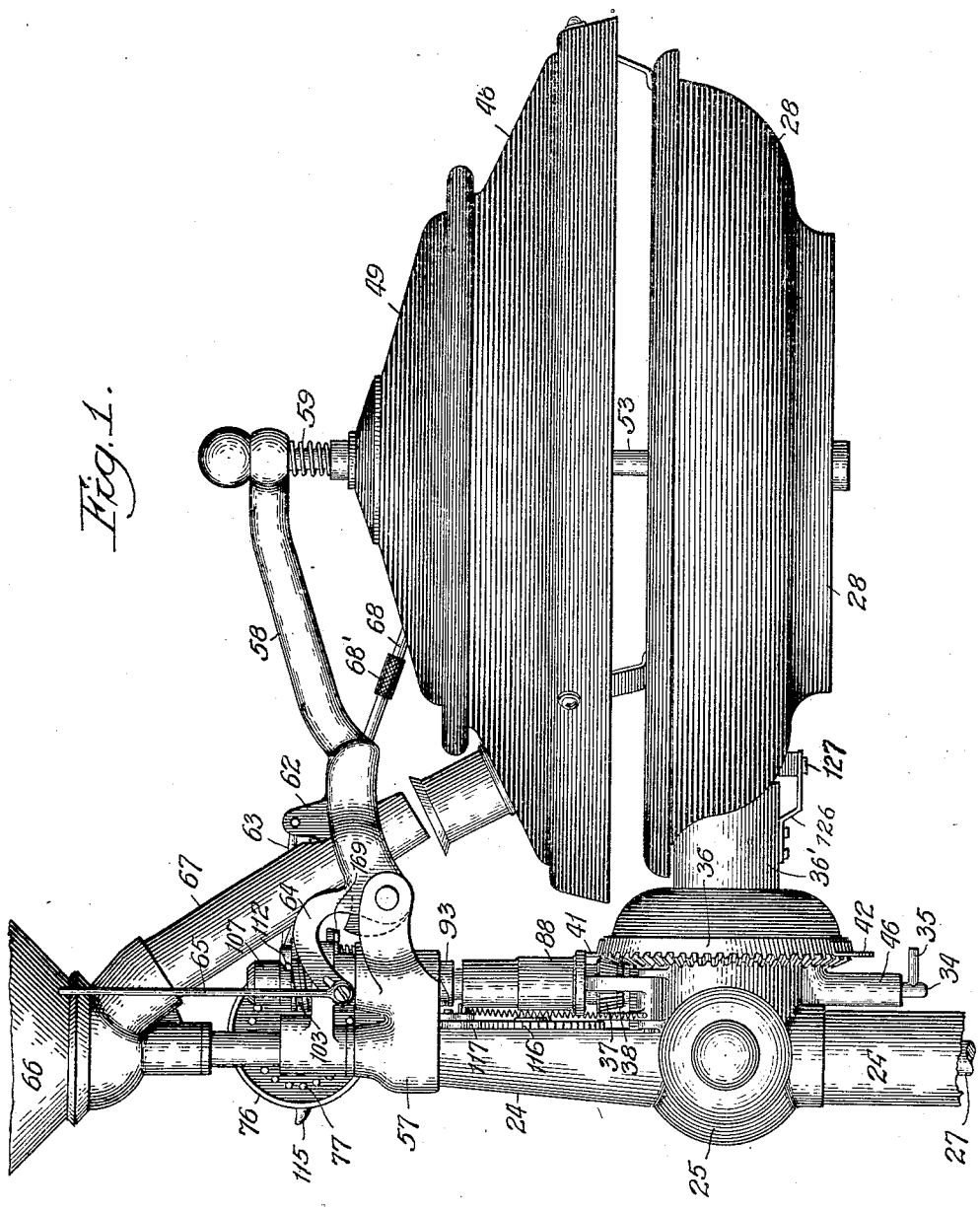
Figure 1, is a side elevation, showing the corn popping pan and its accessories in position for the corn popping operation.

Fig. 3, a companion view to Fig. 2, showing the popping pan and accessories in an inverted or dumping condition.

Fig. 4, is an enlarged vertical central section of the apparatus.

Fig. 5, is a fragmentary elevation with parts in section, illustrating the automatic tripping mechanism of the popping pan, with the mechanism shown in an inactive position.

Fig. 6, is a companion view, with mechanism in an active position.

Figs. 7 and 8, are fragmentary elevations at right angles to Figs. 5 and 6, and showing the two positions aforesaid of said automatic mechanism.

Fig. 9, is a transverse sectional elevation on line 9—9, Fig. 4.

Figs. 10 and 11 are detail horizontal sections on lines 10—10 and 11—11, Fig. 9, respectively.

Fig. 12 is a sectional elevation on line 12—12, Fig. 11, of the upper portion of the engaging mechanism shown in Fig. 9.

Fig. 13, is a detached elevation of the clutch operating arm of the cover actuating mechanism, and the associated holding dog of the secondary holding means of the apparatus.

Fig. 14, is a companion elevation to Fig. 9, with parts in section on line 14—14, Fig. 12.

Fig. 15 is a detail horizontal section on line 15—15, Fig. 14.

Fig. 16 is a detail elevation of the ratchet disk and accessories of the timing mechanism, from the side opposite to that shown in Fig. 14.

Fig. 17 is a detached side elevation of said disk and accessories.

Fig. 18 is a detail horizontal section on line 18—18, Fig. 16.

Fig. 19 is a detail elevation with parts in section of the mutilated bevel gear wheel and its circumferential cams and accessories.

Fig. 20, is a detail perspective view of the operating connection of the semi-rotary disk valve controlling the gaseous fuel supply to the burner of the apparatus.

Fig. 21 is a detail section on line 21—21, Fig. 22, illustrating the shiftable tappet member of the cover actuating mechanism, and the detail structure of the parts.

Fig. 22, is a detail section of the same on the line 22—22, Fig. 21.

Fig. 23, is a detail perspective view of the pivotal end of the cover carrying arm.

Similar reference numerals indicate like parts in the several views.

As represented in the drawings, the general arrangement and operation of parts in the present improvement is similar in many particulars to that of my aforesaid Patent No. 1,201,807, and comprises a structural formation and association of parts as follows:—

24 designates the upright tubular post of the structure, having a hollow head 25 near its upper end forming a support for the horizontal bracket tube 26, upon which are revolubly mounted the fuel gas burner and the popping pan hereinafter described in detail. The bore of the post 24 receives the primary driving shaft 27 of the apparatus, and constitutes a conduit for the fuel gas employed as a heating means in the apparatus, and the hollow head 25 is provided with bearings for the upper end of the aforesaid shaft 27 and rotatable accessories hereinafter described.

28 designates the burner housing, of an annular form, and within which is arranged a fuel gas burner 29, having a horizontal tubular member 30 adapted to fit and turn upon the bracket tube 26 aforesaid, and provided at one end with a fixed valve member 31, preferably of the orificed disk form shown.

32 designates a revoluble valve member associated with the stationary valve member 31, and of a disk form as shown, and provided with a pair of lateral prongs for operative engagement with the lateral arm 33 of an operating stem 34 journaled in the post head 25 aforesaid. The lower end of the stem 34 is provided with an operating handle 35, and other accessories as in my former patented construction and as illustrated in Figs. 4 and 20.

36 designates a bevel gear wheel operatively connected to the outer end of the aforesaid tubular burner member 29, and having alternate intermittent operative engagement with a primary pinion 37 and auxiliary pinion 38 hereinafter described in detail. As in my prior patented construction the portion of the gear teeth of the wheel 36 that mesh with the primary pinion 37 are continuous on the circumference of the wheel, while the portion of the gear teeth of said wheel 36 that meshes with the auxiliary pinion 38 have diametrically opposed mutilations or gaps 39 and 40. In associated relation with said gaps 39, 40, the gear wheel 36 is provided with peripheral primary and secondary cam wings 41, 42, as illustrated in Figs. 4 and 19, and for functions hereinafter set forth in the description of the automatic mechanisms associated therewith. In the present improvement 43, 44 designates a pair of internal recesses or notches formed in the interior of the wheel 36 in associated relation to the gaps 39, 40 aforesaid, and adapted for serial engagement with a stop or positioning roller 45 journaled on a lateral stud of a vertically moving frame 46 that has a yielding downward tendency under the influence of a spring 46'. Said roller 45 is adapted to serially engage the recesses 43, 44, and accurately position the bevel gear wheel 36 in its two periods of rest, hereinafter described.

47 designates the popping pan of the apparatus, having fixed association with the burner housing 28, aforesaid, and is preferably of the same general construction of my prior Patent No. 1,201,807, and with a fixed top member or hood 48 of a truncated cone form, with its lower margin fitting the margin of the popping pan while its contracted upper and open end is closed by the hereinafter described hinged cover 49.

In the present improvement the wall of the top member or hood 48 aforesaid, is formed with a closed annular chamber 50, adapted to receive a filling of heat insulating material, to prevent local radiation of heat from the corn popping chamber, and aid materially in the operation of popping the corn in a rapid and uniform manner.

51 designates radially disposed stirrer blades associated with the bottom of the popping pan 47, and carried by a hub 52 attached to a vertically disposed central shaft 53 journaled in the bottom web of the popping pan 47 and in the burner 29, as shown in Fig. 4. And as in my prior patented construction the shaft 53 will comprise a main lower portion carried by the popping pan and burner as above described, and an upper portion 53' individual to the pan cover 49, with the two sections in axially alined relation during the corn popping operation. The upper section 53' is adapted to swing away from the described alined relation when the pan cover 49 is swung upward in the automatic operation of the apparatus.

54 designates a shaft journaled in the interior of the horizontal bracket tube 26 aforesaid, and having operative connection with the primary driving shaft 27 aforesaid, by bevel gear, 55, and like operative connection with the stirrer shaft 53 by a bevel gear 56, as shown in Fig. 4.

57 designates a bracket piece fixed to the upper portion of the supporting post 24, and having lateral overhanging arms for the pivotal attachment of the carrying arm 58 of the pan cover 49 aforesaid. The connection between the pan cover 49 and the carrying arm 58 is of a sliding nature and is effected by the upper shaft section 53′ journaled in the arm 58 to permit of the free rotation of the pan cover 49, as well as a limited independent rise and fall of said cover under the influence of a spring 59 associated with the parts.

60 designates a cam shaped operating toe on the cover carrying arm 58 adjacent to the pivot axis of the same, and adapted to effect a disengagement of a holding dog of the automatic mechanism hereinafter described.

61 designates a lateral stop lug on the cover carrying arm 58 adjacent to the pivot axis of the same, and adapted to move into the path of an operating arm of the hereinafter described mechanism, by which said cover carrying arm 58 is operated, and thus prevent accidental movement of said mechanism at a certain period in the operation of the apparatus, as set forth in detail in connection with the detail description of said mechanism.

62 designates a crank arm on the cover carrying arm 58 aforesaid, adjacent to the pivot axis of the same, and having operative connection by a connecting rod 63 with an intermittently operated crank disk hereinafter described.

64 designates a companion crank arm on the cover carrying arm 58 adjacent to the pivot axis of the same, and having operative connection by a connecting rod 65 with a corn measuring means disposed in the lower portion of a corn hopper 66 mounted on the upper end of the supporting post 24 and containing a supply of unpopped corn for use in the continued operation of the apparatus.

67 designates a chute extending from the lower portion of the corn hopper 66 to the popping pan 47 and adapted to conduct a charge of corn to the same at the commencement of each popping operation of the apparatus.

68 designates a radially disposed rod mounted in a guide sleeve 69 on the cover carrying arm 58, and in a transverse orifice in the upper shaft section 53′ and adapted to have a semi-rotary and a sliding movement in said supporting means in the operation of the apparatus.

70 designates a spring associated with the rod 68 and its guide sleeve 69 and adapted to yieldingly force said rod in a direction toward the shaft section 53′ aforesaid.

71 designates a radially disposed vane or blade pivoted at its inner end to the rod 68 in adjacent relation to the stirrer shaft 53 aforesaid, with its free end in a depending condition at predetermined distance from the bottom of the popping pan 47. The said blade or vane is adapted to have a turning movement along with the rod 68 as well as an independent vertical swing to and from the said rod 68. The turning or tilting movement just referred to, is imparted to the blade or vane 71 and its carrying rod 68, by the mass of corn being popped, and when said mass reaches a proper popped and expanded condition. As such expanded mass moves around the popping pan 47 with the stirrer blades 48, it contacts with the free end of the vane or blade 71, to turn or tilt the same, and influence the associated mechanism hereinafter described.

The blade or vane 71 is preferably of a skeleton wire form having an open loop 72 at its free end, as shown, and as so formed is capable of being bent up or down so as to receive the described turning movement at any desired period in the popping operation, and to correspond with variations in the quantity of successive charges of corn to which the apparatus is set.

73 designates a laterally disposed tappet arm or sector associated with vane 71 and rod 68, and adapted in a turning movement of said parts to be brought into the path of a revolving pin 74 on the stirrer carrying shaft 53 to cause a radial outward movement of the shaft 68 and accessories and trip or release the clutching means by which the hereinafter described cover lifting and lowering mechanism is brought into operative engagement with a constantly rotating countershaft of the apparatus.

75 designates a lateral stud on the upper shaft section 53′ aforesaid, adapted to contact with the arm or sector 73 aforesaid, to move the same into a normal position out of the path of the revolving pin 74, in case such position is not attained by gravity of the parts.

In the preferred construction the rod 68 is formed in sections connected together by a sliding or telescoping joint 68′ so as to enable the outer section to be independently moved by hand, when it is desired to operate the cover lifting mechanism in advance of its normal automatic operation.

76 designates a crank disk journaled on the side of the supporting post 24, and provided on one face with a series of gear pins 77 for operative engagement with a worm hub hereinafter described. On its other face the crank disk 76 carries a wrist or crank pin 78 for operative engagement by connecting rod 63 with crank arm 62 of the cover carrying arm 58 above described. In the preferred construction the crank pin 78 will comprise an inner stud 78 fixed to the crank disk 76, an outer cylindrical plug 79 into which an end of the connecting rod 63 is screwed and an inclosing collar 80 surrounding said parts and adapted for an independent turning movement thereon as shown more particularly in Figs. 21 and 22, in order that an operating tappet toe 81 on said collar may be turned by hand from an operative into an inoperative position, and vice versa, when the operator desires to change the normal automatic operation of the apparatus as hereinafter described in detail.

82, designates a circumferential slot in the collar 80 to permit and limit the turning adjustment of said hub above described.

83 designates a check ball moving in a transverse orifice of the plug 79 aforesaid, and under the influence of a spring 84, and adapted to engage in one or the other of a pair of recesses 85 in the bore of said collar to hold the same in either of its positions aforesaid.

86 designates a vertical countershaft arranged in spaced relation to the primary driving shaft 27 aforesaid, and operatively connected thereto by a pair of gear wheels 87, as shown in Fig. 4. The auxiliary pinion 38 above referred to is fixedly secured to said countershaft 86 and has constant rotation therewith, while the companion primary pinion 37 is mounted loosely on said countershaft 86, so that said pinion 37 may remain idle during certain stages in the operation of the apparatus, the sole function of the auxiliary pinion 38 being to assist in turning the bevel gear wheel 36, and insure the full semi-revolution of said gear wheel, as the same is intermittently operated.

88 designates a clutch sleeve surrounding the countershaft 86 and adapted to rotate therewith and have a limited vertical movement thereon, through an intermediate key or spline 89 capable of vertical movement in a keyway or groove in the perimeter of said countershaft 86. In the present construction the clutch sleeve 88 and key 89 are connected together to have vertical movement in unison by a lateral toe 90 and a companion groove on and in said parts, and the lower end of said lateral toe is adapted in the lower position of the parts to engage in a notch in the top collar 91 of the primary bevel pinion 38 aforesaid, to effect a positive rotation of said pinion with the countershaft 86.

92 designates a bracket housing attached to the supporting post 24 and formed with a circular bore to provide a bearing for the sleeve and accessories of the countershaft 86, as shown in Figs. 4 and 14 and hereinafter described in detail.

93 designates a cam sleeve keyed or similarly secured to the countershaft 86, above the clutch sleeve 88 aforesaid, and formed with a peripheral cam groove for operative engagement with the pawl and ratchet means of the timing mechanism hereinafter described.

94 designates a spring interposed between the sleeves 88 and 93 aforesaid, and tending to force the clutch sleeve 88 downwardly.

95 designates a catch collar surrounding the countershaft 86, at a point above the cam sleeve 93 and connected by the aforesaid key 89 with the clutch sleeve 88 to have vertical movement therewith. In the present construction the said catch collar is formed with a conical upper end and with a peripheral catch groove 96 for functions hereinafter stated.

As in my prior patented construction the clutch sleeve 88 aforesaid, is provided at its lower end with a circular rim or flange for operative engagement with the primary and secondary cam wings 41 42 of the bevel gear wheel 36 aforesaid, to be moved upwardly into two raised positions, and in which positions the said clutch sleeve is held by the primary and the secondary holding means hereinafter described. To such end the secondary cam wing 42 will have a greater lift than the primary cam wing 41, as shown more particularly in Fig. 19.

The primary holding means above referred to, comprises an association of parts as follows:—

97 designates a horizontally swinging toe coöperating with the secondary cam wing 42 aforesaid. Said toe 97 is carried by a vertical sleeve 98 journaled in the bracket housing 92 aforesaid, with the point of the toe 97 normally in a position above and in the path of the conical upper end of the catch collar 95 aforesaid. In the upward movement of the catch collar 95 and accessories, the aforesaid toe 97 is moved outwardly, against the tension of a spring 99, by the aforesaid conical upper end of the catch collar 95, and with the final upward movement of said collar 95 the point of the toe 97 swings into holding engagement with the peripheral groove 96 of said collar 95 to hold said collar 95 and its associated clutch 88 in their fully raised condition. In such position of the collars 88 and 95, the automatic turning mechanisms of the popping pan—as well as the timing mechanism of the apparatus, are rendered inoperative, while the automatic cover raising and lowering mechanism remain operative to effect a lowering operation of the pan cover, as hereinafter set forth in the operation of the apparatus.

The secondary holding means above referred to comprises an association of parts as follows:

100 designates a pivoted holding dog coöperating with the primary cam wing 41 aforesaid, and adapted to engage beneath the bottom flange of the clutch sleeve 88 aforesaid, to hold the same and its accessories in a position in which the timing mechanism of the apparatus will be in active operation, and the primary bevel pinion will be out of operative engagement with the countershaft. In the present improvement the holding dog 100 is provided with an extension carrying a lateral toe 101 which, as said dog 100 moves beneath the clutch sleeve 88, is adapted to move outwardly into an adjacent mutilation or gap 39 or 40 of the bevel gear wheel 36 and by contact with the gear teeth at the end of a mutilation or gap 39, 40, assist the aforesaid roller and recesses 45 and 43, 44 in preventing any excess movement of said bevel gear wheel 36 past its points of rest heretofore described.

102 designates an operating arm fixed to and moving with the holding dog 100, with its free end extending into the path of a plurality of operating studs of the timing mechanism hereinafter described.

103 designates a worm hub supported on the upper end of the bracket housing 92, and encircling the upper end of the countershaft 86 aforesaid, with its worm formation in operative engagement with the gear teeth 77 of the crank disk 76 aforesaid, to impart rotation thereto. Said worm hub 103 is adapted for intermittent operative connection with the countershaft 86 by a T shaped key 104 sliding vertically in the keyway of said countershaft 86, with a lateral branch 105 adapted to engage in a holding notch in the top of the worm hub 103 to lock the same to said countershaft for rotation therewith. The lateral branch 105 aforesaid, is extended outwardly for engagement with the hereinafter described automatically operated lifting arm by which the key 104, 105 is moved out of engagement with the worm hub 103, and allowed to descend into such engagement, in the continued operation of the apparatus.

106 designates a spring tending to force the key 104 downwardly into engagement with the worm hub 103 aforesaid.

In the preferred construction shown in Fig. 4, a cap piece 107 is secured to the upper end of the countershaft 86 aforesaid and has a lower sleeve extension constituting the bearing for the upper end of said countershaft in the bracket housing 92 aforesaid, as well as a bearing for the worm hub 103. In addition said cap piece 107, acts as a guide for the T shaped key 104 and an inclosure for the spring 106 above described.

108 designates a laterally projecting toe pivoted in the lower portion of the sleeve 98 of the above mentioned primary holding means, by a pivot pin 109, one end of said pin projecting a distance at the side of the sleeve 98 for the purpose hereinafter set forth. The toe 108, is adapted for operative engagement with the cam shaped toe 60, of the cover carrying arm 58 as the cover moves to its raised or open condition, and causes a releasing movement of the sleeve 98 and its associated swinging toe 97 aforesaid, and its pivotal arrangement is adapted to permit a movement of the cover carrying arm 58 in a direction opposite to that above described, without imparting any turning movement to the sleeve 98 and toe 97 aforesaid. The normal position of the toe 108 is yieldingly maintained by the downward stress of the spring 99 before described. In the present structure, the lateral stop lug 61 of the cover carrying arm, as the said arm reaches its fully raised or open position, is adapted to move into the path of the lateral extension of the pivot pin 109, to prevent any accidental movement of the same or of its associated sleeve 98 and swinging toe 97 aforesaid.

110 designates a vertical stem journaled in the upper portion of the sleeve 98, the primary holding means, above described, and the parts are operatively connected together by a radial pin 111 on the stem 110, having limited movement in a horizontally elongated slot 111' in the sleeve 98 to permit limited independent movement between said sleeve 98 and stem 110, in the serial operation of the apparatus hereinafter described.

112 designates a laterally extending clutch operating arm fixed to the upper end of stem 110 aforesaid, and adapted to be moved into and out of the path of the aforesaid operating branch 105 of the clutch key 104 as set forth in the operation of the apparatus. In the present structure the free end of the clutch operating arm 112 is of an inclined or bevel form, and provides an inclined track up which the aforesaid branch 105 of the key 104 rides as said key rotates with the associated countershaft 86, to attain a vertical movement of said clutch key 104 out of clutching engagement with the worm hub 103 aforesaid.

114 designates a lateral operating pin or stud, fixed to the upper end of the stem 110 aforesaid, and adapted for serial operative engagement with the fixed tappet 115 of the crank disk 76 and with the heretofore described shiftable tappet 81 of said crank disk. In the present structure said tappets 81 and 115 are disposed in diametrically opposed relation to each other, so that in continued operation of the mechanism an automatic stoppage of the crank disk 76 is attained at each half-revolution of the same.

In the present construction 113 designates a spring associated with the stem 110 aforesaid and adapted to exert an upward pressure on the stem 110, and effect a frictional contact of the lateral pin 111 against the under side of the bracket housing 92 aforesaid, and provide a yielding resistance against accidental movement of the stem 110 and clutch operating arm 112 from the positions into which they are moved during the actual operation of the mechanism.

The timing mechanism of the apparatus heretofore referred to, comprises a structural formation and association of parts as follows:—

116 designates a ratchet disk journaled on the supporting post 24 of the apparatus, and adapted to receive a step by step rotation from the cam sleeve 93 before described, through an intermediate ratchet mechanism as follows:

117 designates a push pawl pivoted at 118 to the post 24 aforesaid and having a roller 119 intermediate its length for operative engagement with the cam groove 94 of the cam sleeve 93 to receive a vertically swinging movement therefrom and normally transmit the same to the associated ratchet disk 116 aforesaid.

120 designates a holding pawl pivoted at 118 to the post 24 aforesaid, and adapted to engage the ratchet disk 116 and prevent a retrograde movement of the same.

121 designates a cross-bar connected at its respective ends to the pawls 117 and 120 aforesaid, and having a downward yielding stress upon the same under the influence of a spring 122 as shown in Fig. 16.

123 designates a lateral stud carried by the cross-bar 121 and projecting into the path of the upper end of the clutch sleeve 88 aforesaid. Said stud is so positioned with relation to the upper end of said clutch sleeve that operative engagement between the parts takes place only on the secondary movement of said clutch sleeve 88 heretofore described. And in said secondary movement of the clutch sleeve, the cross-bar 121 is lifted vertically to move the push pawl 117 out of operative engagement with the ratchet disk 116 and render the same inactive.

124 and 125 designate a pair of operating studs, disposed in circular spaced relation on the side of the ratchet disk 116 and adapted in the progressive rotation of said disk, to successively operate the pivoted holding dog 100 from its holding engagement beneath the bottom flange of the clutch sleeve 88, to permit the same to descend and effect operative engagement between the countershaft 86 and the primary bevel pinion 37 and impart the required intermittent semi-revolution to the popping pan 47 and its accessories as set forth in the operation of the apparatus.

In the present improvement the hub 36' of the bevel gear 36 has spaced relation to the horizontal tubular member 30 of the fuel gas burner 29, so as to be capable of a sliding adjustment toward said member 30 upon the bracket tube 26, so as to be wholly out of engagement with the operating bevel pinions 37, 38 of the pan turning mechanism of the apparatus.

126 designates a bracket piece secured to one of the aforesaid parts and having a pair of spaced orifices for the passage of an attaching screw 127, for connection of the parts in fixed association at either of the positions above described.

The operation of the apparatus is as follows:—

Assuming that the popping pan 47 has just returned, in an empty condition, to the upright position shown in Figs. 1, 2, 3 and 4, with the pan cover 49 moving down to a closed position, as shown in Fig. 3, under the influence of the crank disk 76, which in this stage of the operation is the only automatic mechanism in operative engagement with the countershaft 86.

As the pan cover 49 and its carrying arm 58 move downward the crank arm 64, through connecting rod 65, actuates the measuring means of the corn popper or receptacle 66, to feed a charge of unpopped corn to the popping pan 47 through the intermediate chute 67. And as the pan cover has about reached its fully closed condition the shiftable tappet 81 of the operating crank disk 76 has operative engagement with the lateral stud 114 to turn the clutch operating arm 112 into operative engagement with the clutching means of the worm hub 103, to release said hub from operative engagement with the countershaft 86, and thus render the cover lifting mechanism inoperative along with the other automatic mechanisms of the apparatus.

Under the effects of heat from the burner 29, the charge of raw corn in the popping pan undergoes a popping process and a consequent increase in bulk, and with such increase in bulk rises in the popping pan to contact with and turn the vane 71, 72, so as to bring the tappet arm 73 into the path of the lateral stud 74 on the shaft section 53. Said stud 74 in its rotation is then adapted to impart a radial outward movement to the rod 68 to engage and rock the lateral stud 114 of the clutch operating arm 112 and effect a withdrawal of said arm 112 from beneath the operating branch 105 of the clutch key 104 and permit said key to descend and lock the worm hub 103 in operative engagement with the countershaft 86 to effect the balance of the opening or rising movement of the pan cover 49, through the crank disk 76 and accessories.

As the pan cover 49 and its carrying arm 58 near their upward movement above mentioned, the cam shaped toe 60 of the arm 58 contacts with the lateral toe 108, and imparts a turning movement horizontally to the same and to the sleeve 98 and swinging toe 97 associated therewith, to withdraw said toe 97 from engagement with the peripheral groove 96 of the catch collar 95 and said collar 95 and its accessories are permitted to descend onto the holding dog 100 of the secondary holding means. In such descent the ratchet pawls 117, 120 of the timing mechanism are lowered into operative engagement with the ratchet disk 116 thereof to impart a progressive step by step rotation to the disk 116 and in time bring the primary stud 124 into operative engagement with the operating arm 102 of the holding dog 100, to release the same from engagement beneath the bottom flange of the clutch sleeve 88 and permit the same to move down into its lowered position.

As the pan cover 49 and its carrying arm 58 reaches a fully raised position, the crank disk 76 will have made a semi-revolution, and its fixed tappet 115 will have operative engagement with the pin 114 to move the clutch arm 112 beneath the clutch key 104, and render the cover operating mechanism inoperative, with the pan cover in a fully raised position.

In the above described downward movement of the clutch sleeve 88 to its lowest position, the lower end of the associated key 89 has engagement with the notched top collar 91 of the primary bevel pinion 37 to cause the same to revolve with countershaft 86 and in turn impart a semi-revolution to the bevel gear wheel 36 and the associated popping pan 47, fuel gas burner 29 and parts associated therewith. With such semi-revolution effected, the popping pan 47 and accessories, are in an inverted position and remain in such position for a period of time to discharge the contents of the popping pan.

The full semi-revolution of the aforesaid parts is controlled, and more than a semi-revolution prevented, by the primary cam wing 41 of the bevel gear wheel 36 acting against the bottom flange of the clutch sleeve 88, to lift the same out of operative engagement with the aforesaid primary pinion 37, and the parts are held in such unclutched condition by the reëngagement of the holding dog 100 beneath the said clutch sleeve 88. In the attainment of the above movements, the auxiliary bevel pinion 38 having constant rotation with the countershaft 86 will effect any remaining portion of the above described semi-revolution of the parts, before the said auxiliary pinion 38 moves into the mutilation or gap 39 of the bevel gear wheel 36. Such final position is additionally insured by the recess and roller 44, 45 and by the lateral prong 101 on the holding dog 100, as fully set forth in the description of said parts.

The timing mechanism in its continued operation brings the secondary stud 125 into operative engagement with the holding dog 100 to actuate the same and again release the clutch sleeve 88, and permit the same to descend into clutching engagement with the primary bevel pinion 37, to effect a succeeding semi-revolution of the popping pan 47 and its accessories.

With said succeeding semi-revolution of the parts, the popping pan is in its righted position, and the full semi-revolution is attained, and more than a full semi-revolution prevented, by the secondary cam wing 42 of the bevel gear wheel 36 acting against the bottom flange of the clutch sleeve 88 to raise the same out of clutching engagement with the primary pinion 37 and into a fully raised condition in which it is held by the engagement of the swinging toe 97 in the peripheral groove 96 of the catch collar 95. The said fully raised condition of the clutch sleeve 88 is attained by the greater size of the cam wing 42, and in addition to effecting the described unclutching of the sleeve 88 and pinion 37, such lift of the sleeve 88 effects a movement of the ratchet pawls 117, 120, out of operative engagement with the ratchet disk 116, by the engagement of the upper end of the sleeve 88, with the lateral stud 123, and renders the timing mechanism inoperative.

In the above described succeeding semi-revolution of the parts, the proper position is additionally insured by the recess and roller 43, 45, and by the lateral prong 101 and mutilation 40, as above described.

In the above described upward movement of the clutch sleeve 88 and its accessories to a fully raised condition, the conical upper end of the catch collar 95 imparts an outward swing to the swinging toe 97 previous to its engagement in the peripheral groove 96 of said collar. Such swinging movement of the toe 97 is imparted to its carrying sleeve 98, and from said sleeve 98, through the pin 111 and slot 111' is imparted to the stem 110 and moves the clutch operating arm 112 from beneath the clutch key 104, 105 and permits the same to clutch the worm hub 103 to the countershaft 86. With the rotation of said worm hub 103 and associated crank disk 76, a downward closing movement of the carrying arm 58 of the pan cover 49 takes place and begins a fresh cycle of the operations above described.

The shiftable nature of the tappet 81, heretofore described is intended to perform the following functions and changes in the normal operation of the machine above described:—

With said tappet 81 turned into an inactive position out of the path of the pin 114, the normal disengagement of the operating worm hub 103 from its driving countershaft 86 will not take place as above stated in the normal operation of the tappet 81, and the worm hub 103 will have continued rotation and through the crank disk 76 and connections, impart an opening movement to the pan cover 47 thus eliminating the period of inactivity of the automatic mechanisms, during which the popping operation normally takes place, and so that with an exhaustion of the supply of unpopped corn the apparatus will run idle, and the various serial steps in the operation will take place with an elimination of the aforesaid popping step or stage.

Having thus fully described my said invention what I claim as new and desire to secure by Letters Patent, is:—

1. In a corn popping apparatus of the class wherein the popping pan receives intermittent semi-revolution in a vertical plane to effect periodic discharge of the finished charges and in which a movable cover distinct from the popping pan has intermittent operative connection with an operating shaft of the apparatus to cover and uncover the opening of said popping pan, the combination with the operative connection of the pan cover aforesaid, of a movable element located in the popping pan and operatively connected to said operative connection to effect an engagement thereof with an operating shaft of the apparatus, substantially as set forth.

2. In a corn popping apparatus of the class wherein the popping pan receives intermittent semi-revolution in a vertical plane to effect periodic discharges of the finished charges and in which a movable cover distinct from the popping pan has intermittent operative connection with an operating shaft of the apparatus to cover and uncover the opening of said popping pan, the combination with the operative connection of the pan cover aforesaid, of a movable element located in the popping pan and operatively connected to said operative connection to effect an engagement thereof with an operating shaft of the apparatus, the said operative connection comprising a combined clutch sleeve and catch collar revoluble with and movable vertically on the driving shaft aforesaid, and a horizontally swinging toe adapted for holding engagement with said catch collar and having operative engagement with the aforesaid movable element in the popping pan, substantially as set forth.

3. In a corn popping apparatus of the class wherein the popping pan receives intermittent semi-revolution in a vertical plane to effect periodic discharge of the finished charges and in which a movable cover distinct from the popping pan has intermittent operative connection with an operating shaft of the apparatus to cover and uncover the opening of said popping pan, the combination with the operative connection of the pan cover aforesaid, of a movable element located in the popping pan and operatively connected to said operative connection to effect an engagement thereof with an operating shaft of the apparatus, the said operative connection comprising a combined clutch sleeve and catch collar revoluble with and movable vertically on the driving shaft aforesaid, a horizontally swinging toe adapted for holding engagement with said catch collar and having operative engagement with the aforesaid movable element in the popping pan, and a cam formation movable with the pan cover and arranged for operative engagement with the swinging toe aforesaid, substantially as set forth.

4. In a corn popping apparatus of the class wherein the popping pan receives intermittent semi-revolution in a vertical plane to effect periodic discharges of the finished charges and in which a movable cover distinct from the popping pan has intermittent operative connection with an operating shaft of the apparatus to cover and uncover the opening of said popping pan, the combination with the operative connection of the pan cover aforesaid, of a movable element located in the popping pan and operatively connected to said operative connection to effect an engagement thereof with an operating shaft of the apparatus, the said operative connection comprising a combined clutch sleeve and catch collar revoluble with and movable vertically on the driving shaft aforesaid, a horizontally swinging toe adapted for holding engagement with said catch collar and having operative engagement with the aforesaid movable element in the popping pan, a worm hub arranged loosely on the operating shaft aforesaid, a clutching means associated with said hub and shaft and operatively connected to the catch collar aforesaid, and a crank disk having operative connection with said worm hub and with the pan cover, substantially as set forth.

5. In a corn popping apparatus of the class wherein the popping pan receives intermittent semi-revolution in a vertical plane to effect periodic discharges of the finished charges and in which a movable cover distinct from the popping pan has intermittent operative connection with an operating shaft of the apparatus to cover and uncover the opening of said popping pan, the combination with the operative connection of the pan cover aforesaid, of a movable element located in the popping pan and operatively connected to said operative connection to effect an engagement thereof with an operating shaft of the apparatus, the aforesaid movable element comprising a sliding rod associated with the pan cover, and a vane carried by said rod within the popping chamber and adapted for operation by the popped corn therein, substantially as set forth.

6. In a corn popping apparatus of the class wherein the popping pan receives intermittent semi-revolution in a vertical plane to effect periodic discharges of the finished charges and in which a movable cover distinct from the popping pan has intermittent operative connection with an operating shaft of the apparatus to cover and uncover the opening of said popping pan, the combination with the operative connection of the pan cover aforesaid, of a movable element located in the popping pan and operatively connected to said operative connection to effect an engagement thereof with an operating shaft of the apparatus, the aforesaid movable element comprising a sliding rod associated with the pan cover, and a vane carried by said rod within the popping chamber and adapted for operation by the popped corn therein, the sliding rod being formed in sections slidingly connected together, substantially as set forth.

7. In a corn popping apparatus of the class wherein the popping pan receives intermittent semi-revolution in a vertical plane to effect periodic discharges of the finished charges and in which a movable cover distinct from the popping pan has intermittent operative connection with an operating shaft of the apparatus to cover and uncover the opening of said popping pan, the combination with the operative connection of the pan cover aforesaid, of a movable element located in the popping pan and operatively connected to said operative connection to effect an engagement thereof with an operating shaft of the apparatus, the aforesaid movable element comprising a sliding rod associated with the pan cover, a vane carried by said rod within the popping chamber, a tappet arm associated with said rod and vane, and a revoluble shaft carrying a lateral pin adapted for operative engagement with said tappet arm, substantially as set forth.

8. In a corn popping apparatus of the class wherein the popping pan receives intermittent semi-revolution in a vertical plane to effect periodic discharges of the finished charges and in which a movable cover distinct from the popping pan has intermittent operative connection with an operating shaft of the apparatus to cover and uncover the opening of said popping pan, the combination with the operative connection of the pan cover aforesaid, of a movable element located in the popping pan and operatively connected to said operative connection to effect an engagement thereof with an operating shaft of the apparatus, the aforesaid movable element comprising a sliding rod associated with the pan cover, a vane carried by said rod within the popping chamber, a tappet arm associated with said rod and vane, a revoluble shaft carrying a lateral pin adapted for operative engagement with said tappet arm, and a revoluble shaft carrying a pin adapted to engage said tappet and move the same into an inoperative position, substantially as set forth.

9. In a corn popping apparatus of the type herein described, the combination of a supporting post having a horizontal tubular supporting bracket, a popping pan and heating accessories revolubly mounted on said bracket, a gear wheel having a hub portion revolubly and slidingly mounted on said bracket, and means for securing said wheel and hub at the positions to which they are slidingly adjusted, substantially as set forth.

Signed at Chicago, Illinois, this 2nd day of January, 1917.

CHARLES CRETORS.

Copies of this patent may be obtained for five cents each, by addressing the "Commissioner of Patents, Washington, D. C."